Patented May 18, 1948

2,441,561

UNITED STATES PATENT OFFICE 2,441,561

PHOTOCHEMICAL PREPARATION OF STABLE DYES

Lyman Chalkley, Brick Township, Ocean County, N. J.

No Drawing. Application July 23, 1943, Serial No. 495,849

3 Claims. (Cl. 204—158)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the manufacture of dyes, and more particularly to the manufacture of stable dyes from aminotriarylacetonitrile.

This application is a continuation-in-part of Serial No. 309,107, filed December 13, 1939, which issued as United States Patent No. 2,325,038, dated July 27, 1943.

It is an object of this invention to prepare stable dyes from aminotriarylacetonitriles. Another object is to provide a simple and rapid method for carrying out the conversion of aminotriarylacetonitriles into stable dyes. Other objects will appear hereinafter.

These objects are accomplished in accordance with this invention wherein a solution of aminotriarylacetonitrile is exposed to actinic light in the presence of an organic acidic substance. The aminotriarylacetonitriles represent unusually difficult dye intermediates for conversion into dyestuffs, but it has been found that under acidic conditions and by treatment with actinic rays, preferably exposure to ultra-violet light within the spectral region between 2500 and 3000 Angstrom units, there results a permanent conversion of the said substituted acetonitriles into dyestuffs of great utility.

Suitable aminotriarylacetonitriles adapted for conversion into dyestuffs in accordance with the present invention include bis-aminotriphenylacetonitrile, tris-aminotriphenylacetonitrile, bis-aminotrinaphthylacetonitrile and derivatives thereof in which one or more of the amino hydrogen atoms may be replaced by an alkyl radicle and in which one or more of the nuclear hydrogen atoms of the phenyl residues may be replaced by substituents known to the dye chemist. Instead of the phenyl nucleus, other aminotriarylacetonitriles can be employed in which the aryl residue is naphthyl or similar aryl residue. Suitable alkyl radicles for substitution on the amino portion of the molecule include methyl, ethyl, propyl, iso-propyl, butyl, iso-butyl, amyl, hexyl and similar aliphatic alkyl radicles. Mercuri, sulfonic, alkyl (methyl, ethyl and the like), and similar radicals as well as the halogens (chloro, bromo, iodo and fluoro), may be substituted on the aryl nucleus. Representative aminotriarylacetonitriles suitable for conversion into dyestuffs in accordance with the present invention include 4,4',4" - triaminotriphenylacetonitrile; 4,4',4" - tris-dimethylaminotriphenylacetonitrile; 3,3',3"-trichloro - 4,4',4" - tris-dimethylaminotriphenylacetonitrile; 3,3'-dihydroxy-mercuri-4,4'-bis-dimethylamino - triphenylacetonitrile; 4,4' - bis-aminotriphenylacetonitrile; 4,4'-bis-monomethylaminotriphenylacetonitrile; 4,4'-bis-dimethylaminotriphenylacetonitrile; 4,4'-bis-monoethylaminotriphenylacetonitrile; 4,4' - bis - diethylaminotriphenylacetonitrile, and other aminotriarylacetonitriles.

I have now found that the nitriles may be irreversibly and completely converted into the dyes by means of a photochemical reaction in the presence of organic acidic substances.

I find that in the presence of organic acidic substances, preferably carboxylic acids such as, acetic, propionic, and oxalic, the nitriles when exposed to light of proper wave length are converted into the corresponding dyes. Other useable acidic substances include phenols, benzenesulfonamides, and acids such as uric, sulfamic, tartaric, citric, and benzoic as well as half-esters of polycarboxylic acids. These acids may be used in concentrations ranging from one equivalent per mole of nitrile to a dilute solution of the nitrile in the pure acid. Where another solvent is employed in addition to the acid I find the lower aliphatic alcohols, such as methyl, ethyl and isopropyl, especially suitable. Carboxylic acids other than the fatty acids may be used providing that their absorption spectra do not screen the nitrile absorption so that the photoreaction is interfered with. Such acids as succinic, benzoic, salicyclic, etc. are suitable. As stated above, the acidic substances useful in the present process are organic acidic substances including the carboxylic acids that consist of carbon, hydrogen, and oxygen. The indicated examples of such carboxylic acids are acetic, propionic, oxalic, tartaric, citric, benzoic, succinic, salicylic, and half-esters of polycarboxylic acids.

The effective radiation follows the Grotthus-Draper absorption law, and is of the wave lengths absorbed by the nitrile solution. These wave lengths may readily be ascertained by a determination of the absorption spectrum of the solution. In practice it is usually easy enough to determine the wave length of the effective radiation by empirical trial. In general, the most effective radiation for the simple unsubstituted nitriles lies in the spectral region between 2500 and 4000 Ångstrom units, although radiation in the visible range may be somewhat effective.

The amino triaryl methane dyes are not themselves insensitive to light and are decomposed by prolonged irradiation with the visible light which they absorb. Therefore, the radiation used to convert the nitrile into the dye should have as much as possible of the energy concentrated in the region of the nitrile absorption and as little as possible in the region of absorption of the resulting dye. It may be desirable not to convert all of the nitrile present in a reaction mixture into dye at one time, but to stop the photo-reaction when a fraction of the nitrile has been converted, separate the dye from the unchanged nitrile, and start again with a pure solution of nitrile. In this way photo-decomposition of the dyestuff is reduced.

The following examples illustrate how the invention may be carried out, but the invention is not limited thereto. Parts are by weight unless otherwise designated, and the indicated temperatures are on the centigrade scale.

*Example 1*

A solution of 3,3',3''-trichloro-4,4',4''-trisdimethylaminotriphenylacetonitrile in glacial acetic acid is made in the proportion of 5 g. of nitrile to 100 cc. of acetic acid. This solution is supersaturated at room temperature, but will not produce a precipitate for several hours, often for a day or more. The solution is placed in a clear quartz flask and exposed for a few—three to four—hours to the light from an arc lamp using ultra violet cored carbons ("Therapeutic C"). The solution is constantly stirred and cooled with water during the exposure. Caution should be observed in carrying out the photochemical reaction because of the evolution of hydrogen cyanide.

After the exposure to light the deeply colored solution is poured into 3 volumes of water, the whole brought to a boil to remove traces of hydrogen cyanide, and filtered to remove unchanged nitrile.

The filtrate contains the dye, which has the composition of 3,3',3''-trichloro - crystal - violet acetate.

This filtrate when treated with ¼ of its volume of 4 normal sodium chloride solution readily dyes silk blue—a bluer tone than given by crystal violet. The carbinol may be precipitated from the dye solution by treatment with excess of sodium hydroxide solution.

In the photochemical reaction other types of ultra violet lamps may be used to replace the carbon arc. The iron arc, quartz mercury arc, the high tension discharge under water between aluminum or brass electrodes are suitable.

*Example 2*

A reaction mixture of 5 g. of 4,4'-bis-dimethylaminotriphenyl-acetonitrile and 3 grams of oxalic acid in 100 cc. of ethyl alcohol is boiled under a reflux condenser in a quartz flask while being exposed to the light of a quartz mercury arc until the color has become a deep blue. The time required will be from half an hour to two or three hours depending upon the intensity of illumination. The solution is poured into 200 cc. of water and allowed to cool. The cooled solution is filtered from unchanged nitrile, and evaporated on the water bath until a sample on cooling precipitates malachite green in the form of the oxalate.

*Example 3*

A solution of 1 g. of 3,3'-dihydroxymercuri-4,4'-bis-dimethylaminotriphenylacetonitrile in 100 cc. of 95% methyl alcohol and 2½ cc. of acetic acid is exposed to the light of an ultra violet carbon arc. The solution is held in a quartz flask, and is stirred while the flask is cooled with water during exposure. After 6 hours of exposure the solution is poured into one volume of water, allowed to stand 24 hours for precipitation of unchanged nitrile, and filtered through a fine filter paper. The deep blue filtrate contains a dye having the formula:

3 acetoxymercuri-3'-cyanomercuri-malachite-green acetate.

*Example 4*

5 g. of 4,4',4''-triamino-triphenyl-acetonitrile is placed in a quartz flask with 2 cc. of propionic acid and 100 cc. of boiling methyl alcohol. The mixture is stirred and exposed to sunlight behind a red purple "Corex A" optical filter for several hours. The alcohol is then evaporated, the residue taken up in 25 cc. of water, filtered from unchanged nitrile, and the para rosaniline chloride salted out by addition of saturated sodium chloride solution.

*Example 5*

The procedure of Example 4 is repeated, except that 4,4',4''-tris-dimethylamino-triphenyl - acetonitrile is substituted for the nitrile used in Example 4. The end product is crystal voilet.

It will be apparent from the foregoing description that a simple and expeditious method has been provided for the conversion of aminotriarylacetonitriles into stable dyestuffs by the combination of exposure to actinic light and the employment of an organic acid menstruum. The dyes produced do not revert to the colorless prototypes even though they are not separated from the reaction menstruum. They can, however, be readily separated by precipitation with an alkali and reconverted to the dyestuff form by acidification, preferably with an organic carboxylic acid.

Various changes can be made in the invention as described without departing from the spirit and scope thereof.

What is claimed is:

1. A process for irreversibly converting an aminotriarylacetonitrile into a stable dye comprising the steps of providing a solution of an aminotriarylacetonitrile and a carboxylic acid consisting of carbon, hydrogen, and oxygen, said acid being present in an amount not substantially less than one equivalent of said acid per mole of said nitrile, and irradiating said solution with ultraviolet light within the spectral range from 2500 to 4000 Ångstrom units to produce a direct reaction of said nitrile with said acid and thereby convert said nitrile into a stable dye salt.

2. A process for irreversibly converting an aminotriarylacetonitrile into a stable dye comprising the steps of providing a solution of an aminotriarylacetonitrile in a carboxylic acid consisting of carbon, hydrogen, and oxygen, said acid being present in an amount not substantially less than one equivalent of said acid per mole of said nitrile, and irradiating said solution with ultraviolet light within the spectral range from 2500 to 4000 Ångstrom units to produce a direct reaction of said nitrile with said acid and thereby convert said nitrile into a stable dye salt.

3. A process for irreversibly converting an aminotriarylacetonitrile into a stable dye comprising the steps of providing a solution of both aminotriarylacetonitrile and a carboxylic acid in a lower aliphatic alcohol, said acid consisting of carbon, hydrogen, and oxygen, said acid being present in an amount not substantially less than one equivalent of said acid per mole of said nitrile, and irradiating said solution with ultraviolet light within the spectral range from 2500 to 4000 Ångstrom units to produce a direct reaction of said nitrile with said acid and thereby convert said nitrile into a stable dye salt.

LYMAN CHALKLEY.

REFERENCES CITED

The following references are of record in the file of this patent:

UNITED STATES PATENTS

| Number | Name | Date |
| --- | --- | --- |
| 2,214,365 | Flynn et al. | Sept. 10, 1940 |
| 2,325,038 | Chalkley | July 27, 1943 |

OTHER REFERENCES

Chemical Action of Ultraviolet Rays; Ellis et al.; 1941, pages 626–631.

Artificial Sunlight; Luckiesch; 1930; page 116.

Hackh's Chemical Dictionary; Third edition; 1944; pages 878–879.

Harris et al.; Journal American Chemical Society, volume 57; 1935; page 1151–1154.